No. 727,747. PATENTED MAY 12, 1903.
G. H. CHAPEL.
EYEGLASSES.
APPLICATION FILED OCT. 1, 1902.
NO MODEL.
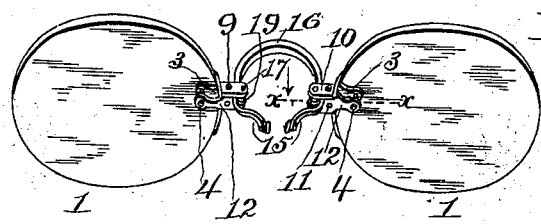
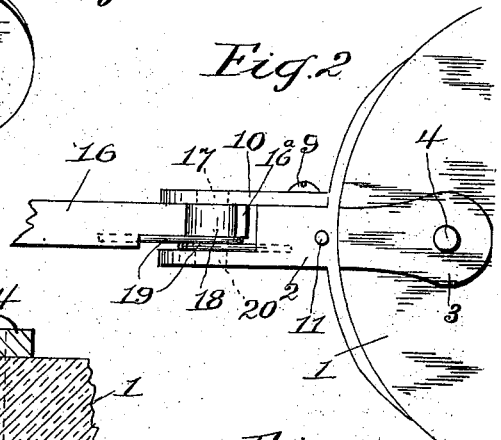
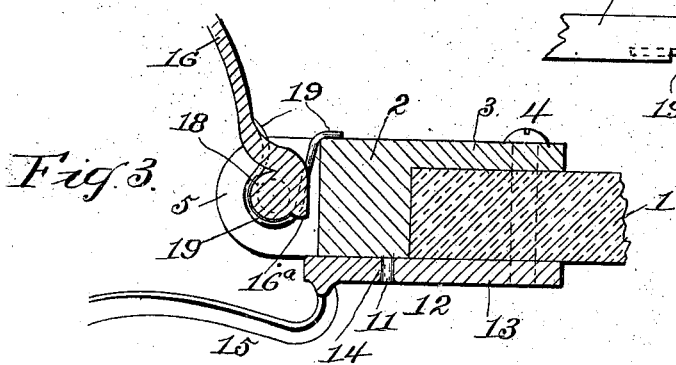
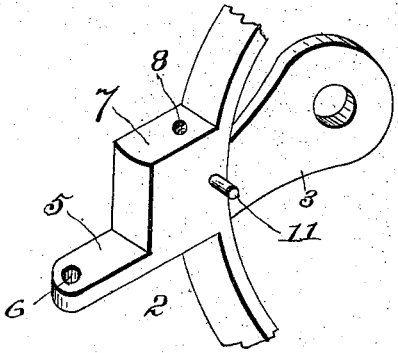
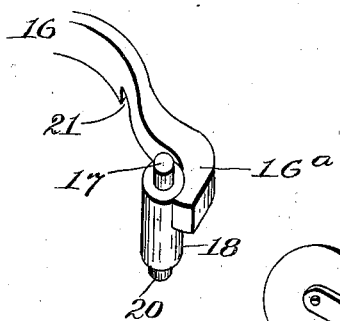
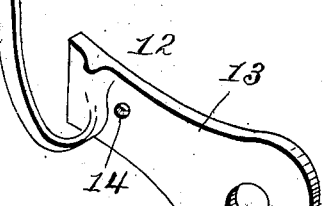
Witnesses
Inventor
George H. Chapel No. 727,747. Patented May 12, 1903.

UNITED STATES PATENT OFFICE.

GEORGE H. CHAPEL, OF HOWELL, MICHIGAN.

EYEGLASSES.

SPECIFICATION forming part of Letters Patent No. 727,747, dated May 12, 1903.

Application filed October 1, 1902. Serial No. 125,453. (No model.)

*To all whom it may concern:*

Be it known that I, GEORGE H. CHAPEL, a citizen of the United States, residing at Howell, in the county of Livingston and State of Michigan, have invented certain new and useful Improvements in Eyeglasses, of which the following is a specification.

This invention relates to frameless eyeglasses, and particularly to the class of such glasses having a stiff or springless bridge as distinguished from those having a rigid bridge connection with the lens and from those having a yielding or spring bridge.

The object of the invention is to provide an improved pivot-spring connection between the bridge and the nose-grips or plaquettes, so that a yieldable joint is made between the bridge and lens.

A further object of the invention is to provide a novel and peculiar device clamped to the lens in such manner as to fix the nose-grips or plaquettes rigid with the lens and to form a pivot between the bridge, the lens, and said grips.

Other objects, advantages, and improved results accruing from the special construction and arrangement of parts will be revealed in the specification and claims to follow.

As far as known to me the lenses of nose-glasses are connected either by a spring-bridge rigid with the lens or by a stiff bridge having the nose-grips or plaquettes pivoted thereto in various forms. In both of such arrangements the bridge is fixed rigid with the lens, and while a pivot-spring connection between the bridge and nose-grips is found, still the connection between the lens and the bridge is rigid and non-yieldable. The inconvenience, annoyance, and disadvantages of the ordinary spring-bridge are well known, and the difficulty of operating the pivoted plaquettes to adjust them to a wearer's nose and to make them retain their grip is obvious. It is therefore the purpose and intent of this invention to provide means to overcome such objections, disadvantages, and difficulties and to supply a nose-glass having the bridge, lens, and nose-grips pivoted together, so that in using the glasses a forward movement of the lenses will open the grips, and the latter will be closed by a spring at the pivot-point when the lenses are relieved of such forward movement.

In the accompanying drawings, forming part of this application, Figure 1 is a perspective view of a pair of glasses with my invention applied. Fig. 2 is an enlarged elevation of one of the pivot connections with the nose-grip thereof removed. Fig. 3 is an enlarged sectional view on the line $xx$, Fig. 1. Fig. 4 is a detail perspective view of one end of the bridge. Fig. 5 is a detail perspective view of the pivot-clamp portion. Fig. 6 is a detail perspective view of the grip-clamp portion.

The same numeral references denote the same parts throughout the several views of the drawings.

The lenses 1 are of the usual kind and shape and are clamped by my improved clamping device, comprising two portions or members. The clamping member 2 has a flange 3 to engage one side of a lens and through which and the lens a set-screw 4 is passed into the other clamping member, hereinafter referred to. The member 2 has an ear 5, provided with a pivot-bearing 6 and a slightly-concaved surface 7, having a set-screw hole 8 for a set-screw 9 to hold a pivot-bearing plate 10 fixed to the said member. The concaved surface 7 permits a closer joint to be made between the pivot-plate and the member 2 and a ready means of adjusting the plate relative to the pivot-ear to vary the bearing of the pivot. The inner face of the member 2 is provided with a pin 11. The other clamping member 12 has a flange 13, through which the screw 4 is passed, and an aperture 14 to fit the pin 11 and prevent the parts turning as they are clamped to a lens. This clamping member has an integral nose-grip 15, projecting therefrom.

The nose-bridge 16 may be of any desired shape, of non-flexible material, so that it is rendered stiff or springless from one end to the other. The ends of the bridge being of the same construction and arrangement relative to the clamping device, one end will be herein described in detail. It is flattened at $16^a$ to work between the pivot-plate and the pivot-ear of the clamping members, with its edge engaging the clamp to limit the inward movement of the grips 15. The flattened portion is provided on one side with a pivot-post 17, and upon the other side is formed a bearing 18 for a spring 19, and a pivot-post 20 projects from the bearing 18. A shoulder 21 is formed near the end of the bridge to hold one end of the spring 19, and the latter being set over its bearing 18 the other end of the spring is hooked over a corner of the clamping member 2.

It is obvious that in assembling the parts the clamping members are screwed to the lens with the pin in its aperture. The end of the bridge, with the spring 19 on its bearing 18, is adjusted so that the pivot-posts will fit their bearings and the ends of the spring their bearings. Then the pivot-plate is screwed upon the concaved surface to give the pivot-posts a free and proper pivot action.

It is obvious that when the glasses are not in use the nose-grips are contracted or held close together by the spring-pivots and that to apply the glass the lenses have simply to be moved on the pivots, which will open or expand the nose-grips, as desired, or until the bridge edges strike the clamp and stop the movement of the grips, and upon releasing the lens the nose will be gripped under pressure of the pivot-springs.

It will be seen that the grips are arranged to grasp noses of various forms and shapes and that the pivot being between the bridge and lens and the grips fixed to the lenses it will require a decided movement of the latter to release the grips, so that the glasses are not liable to be knocked or shaken from the nose.

Having thus described my invention, what I claim as new, and desire to secure by Letters Patent, is—

1. The combination, with a nose-bridge having pivot-post, of a two-part clamp having a nose-grip, and a pivot-bearing, a pivot-bearing plate, and a spring carried by the bridge and in the clamp to control the movement of the latter.

2. The combination, with a bridge having pivot-posts and a spring-bearing, of a two-part clamp, a nose-grip integral with one part of the clamp, a pivot-bearing ear on the other part of the clamp, a pivot-bearing plate secured to this clamp part, and a spring working on said spring-bearing with its ends engaging the bridge and the clamp.

3. The combination, with a nose-bridge having pivot-posts, of a lens-clamp in which one of the posts is pivoted, a plate detachably secured to the clamp and in which the other post is pivoted, and a spring in the clamp to control the movement of the lenses.

4. The combination, with a nose-bridge having two pivot-posts on each end, and spring-bearing between the posts of each end, of a two-part lens-clamp, one part having a concaved surface and a pivot-bearing for one of the posts, a plate secured on said surface and forming a pivot-bearing for the other post, a nose-grip rigid with the other clamp part, and a spring on the said spring-bearing and having one end engaging the clamp, and the other end engaging the bridge to control the movement of the clamp.

In witness whereof I hereunto set my hand in the presence of two witnesses.

GEORGE H. CHAPEL.

Witnesses:
E. A. STOWE,
GEO. C. HAMMELL.